United States Patent
Lecerf

(10) Patent No.: US 11,036,963 B2
(45) Date of Patent: Jun. 15, 2021

(54) OBJECT RECOGNITION SYSTEM BASED ON AN ADAPTIVE 3D GENERIC MODEL

(71) Applicant: MAGNETI MARELLI S.P.A., Corbetta (IT)

(72) Inventor: Loïc Lecerf, Meylan (FR)

(73) Assignee: MAGNETI MARELLI S.P.A., Corbetta (IT)

( * ) Notice: Subject to any disclaimer, the term of this patent is extended or adjusted under 35 U.S.C. 154(b) by 22 days.

(21) Appl. No.: 16/469,561

(22) PCT Filed: Nov. 21, 2017

(86) PCT No.: PCT/FR2017/053191
§ 371 (c)(1),
(2) Date: Jun. 13, 2019

(87) PCT Pub. No.: WO2018/109298
PCT Pub. Date: Jun. 21, 2018

(65) Prior Publication Data
US 2019/0354745 A1    Nov. 21, 2019

(30) Foreign Application Priority Data
Dec. 14, 2016   (FR) ..................................... 1662455

(51) Int. Cl.
*G06K 9/00* (2006.01)
*G06K 9/62* (2006.01)
(Continued)

(52) U.S. Cl.
CPC ....... *G06K 9/00201* (2013.01); *G06K 9/6255* (2013.01); *G06K 9/6257* (2013.01);
(Continued)

(58) Field of Classification Search
CPC combination set(s) only.
See application file for complete search history.

(56) References Cited

U.S. PATENT DOCUMENTS 5,397,985 A * 3/1995 Kennedy ............... E21B 47/085
324/221
7,848,547 B2 * 12/2010 Takeguchi ......... G06K 9/00248
382/118
(Continued)

OTHER PUBLICATIONS

ISA/EP, "International Search Report," Application No. PCT/FR2017/053191, dated Feb. 15, 2018, 13 pages.

*Primary Examiner* — Iman K Kholdebarin

(57) ABSTRACT

A method for configuring a system for recognizing a class of objects of variable morphology, comprising providing a machine learning system with an initial data set to recognize instances of objects of the class in a sequence of images of a target scene; providing a three-dimensional model specific to the class of objects, the morphology of which can be defined by a set of parameters; acquiring a sequence of images of the scene using a camera; recognizing image instances of objects of the class in the acquired image sequence; conforming the generic three-dimensional model to recognized image instances; storing variation ranges of the parameters resulting from the conformations of the generic model; synthesizing multiple three-dimensional objects from the generic model by varying the parameters in the stored variation ranges; and complementing the data set of the learning system with projections of the synthesized objects in the plane of the images.

3 Claims, 1 Drawing Sheet

(51) Int. Cl.
    *G06T 15/04*          (2011.01)
    *G06T 17/20*          (2006.01)
(52) U.S. Cl.
    CPC ............ *G06K 9/6267* (2013.01); *G06T 15/04*
                    (2013.01); *G06T 17/20* (2013.01)

(56) References Cited

U.S. PATENT DOCUMENTS

| | | | | |
|---|---|---|---|---|
| 7,873,190 | B2* | 1/2011 | Yuasa | G06K 9/00281 |
| | | | | 382/118 |
| 7,925,048 | B2* | 4/2011 | Kinoshita | G06K 9/00208 |
| | | | | 382/103 |
| 7,936,902 | B2* | 5/2011 | Kinoshita | G06K 9/00281 |
| | | | | 382/103 |
| 8,107,688 | B2* | 1/2012 | Kozakaya | G06K 9/00221 |
| | | | | 382/117 |
| 8,116,534 | B2* | 2/2012 | Nishiyama | G06K 9/00261 |
| | | | | 382/118 |
| 8,938,117 | B2* | 1/2015 | Yano | G06K 9/6857 |
| | | | | 382/159 |
| 9,013,482 | B2* | 4/2015 | Lim | G06T 17/20 |
| | | | | 345/421 |
| 9,165,211 | B2* | 10/2015 | Rhee | G06K 9/4671 |
| 9,633,483 | B1* | 4/2017 | Xu | G06T 17/10 |
| 9,684,850 | B2* | 6/2017 | Saito | G06K 9/00281 |
| 10,380,411 | B2* | 8/2019 | Escalier | G06K 9/00248 |
| 2004/0175039 | A1* | 9/2004 | Miller | G06K 9/6255 |
| | | | | 382/181 |
| 2006/0063135 | A1* | 3/2006 | Mehl | A61C 9/0053 |
| | | | | 433/223 |
| 2006/0269143 | A1* | 11/2006 | Kozakaya | G06K 9/00288 |
| | | | | 382/218 |
| 2008/0309664 | A1* | 12/2008 | Zhou | G06T 17/20 |
| | | | | 345/420 |
| 2010/0123714 | A1* | 5/2010 | Langeland | G06T 19/00 |
| | | | | 345/419 |
| 2012/0299911 | A1* | 11/2012 | Tytgat | G06T 7/285 |
| | | | | 345/419 |
| 2014/0375636 | A1* | 12/2014 | Young | B33Y 50/00 |
| | | | | 345/420 |
| 2015/0279118 | A1* | 10/2015 | Dou | G06T 7/55 |
| | | | | 345/427 |
| 2019/0122411 | A1* | 4/2019 | Sachs | G06T 7/248 |
| 2019/0354745 | A1* | 11/2019 | Lecerf | G06K 9/00201 |

* cited by examiner

OBJECT RECOGNITION SYSTEM BASED ON AN ADAPTIVE 3D GENERIC MODEL

CROSS-REFERENCE TO RELATED APPLICATIONS

This application is a 371 National Stage of International Patent Application No. PCT/FR2017/053191, filed Nov. 21, 2017, which claims priority to French Patent Application No. 1662455, filed Dec. 14, 2016, each of which are incorporated herein by reference into the present disclosure as if fully set forth herein.

FIELD

The invention relates to moving object recognition systems, especially systems based on machine learning.

BACKGROUND

The isolation and tracking of a moving object in a sequence of images may be performed by relatively simple generic algorithms based, for example, on background subtraction. On the other hand, it is more difficult to classify the objects thus isolated into categories that one wishes to detect, i.e. recognize whether the object is a person, a car, a bicycle, an animal, etc. Indeed, the objects may have a large variety of morphologies in the images of the sequence (position, size, orientation, distortion, texture, configuration of eventual appendices and articulated elements, etc.). The morphologies also depend on the field of view and the lens of the camera that monitors the scene. Sometimes it is also desired to recognize subclasses (car model, gender of a person).

Machine learning systems are generally used to classify and detect objects. The classification is then based on a knowledge base or a data set obtained through learning. An initial data set is generally generated during a so-called supervised learning phase, where an operator views sequences of images produced in context and manually annotates the image areas corresponding to the objects to be recognized. This phase is generally long and tedious, because it is ideally sought to capture all the possible alternatives of the morphology of the objects of the class, at least sufficient alternatives to obtain a satisfactory recognition rate.

To alleviate this initial task of supervised learning, machine learning techniques have been proposed wherein, rather than supplying the data set with annotated real images, it is supplied with automatically annotated synthesized images generated from three-dimensional models of the objects to be recognized. Such a technique is described for configuring a pedestrian detector in the article ["Learning Scene-Specific Pedestrian Detectors Without Real Data", Hironori Hattori et al. 2015 IEEE Conference on Computer Vision and Pattern Recognition (CVPR)]. A similar technique is described for configuring a car detector in the article "Teaching 3D Geometry to Deformable Part Models", Bojan Pepik et al. 2012 IEEE Conference on Computer Vision and Pattern Recognition (CVPR).

A feature of these techniques is that they generate many synthesized images that, although they conform to the parameters and constraints of 3D models, have unlikely morphologies. This clutters the data set with unnecessary images and can slow down recognition.

In addition, some objects have such a variable morphology that it is difficult to realistically reproduce all possibilities with a 3D model having a manageable number of parameters and constraints. This results in gaps in the data set and detection misses for certain objects.

SUMMARY

A method for automatically configuring a system for recognizing a class of objects of variable morphology is generally provided, comprising the steps of providing a machine learning system with an initial data set sufficient to recognize instances of objects of the class in a sequence of images of a target scene; providing a generic three-dimensional model specific to the class of objects, the morphology of which can be defined by a set of parameters; acquiring a sequence of images of the scene using a camera; recognizing image instances of objects of the class in the acquired image sequence, using the initial dataset; conforming the generic three-dimensional model to recognized image instances; storing variation ranges of the parameters resulting from the conformations of the generic model; synthesizing multiple three-dimensional objects from the generic model by varying the parameters in the stored variation ranges; and complementing the data set of the learning system with projections of the synthesized objects in the plane of the images.

The method may further include the steps of defining parameters of the generic three-dimensional model by the relative positions of landmarks of a mesh of the model, the positions of the other nodes of the mesh being bound to the landmarks by constraints; and performing conformations of the generic three-dimensional model by positioning landmarks of a projection of the model in the plane of the images.

The method may further include steps of storing textures from areas of the recognized image instances; and mapping on each synthesized object a texture among the stored textures.

The initial data set of the learning system may be obtained by supervised learning involving at least two objects of the class whose morphologies are at opposite ends of an observed variation domain of morphologies.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

To simplify the initial configuration phase of an object detector, it is proposed herein, like in the aforementioned article by Hironori Hattori, to configure a machine learning system using synthesized and automatically annotated images from three-dimensional models. However, to improve the recognition rate, the three-dimensional models are obtained from a parametric generic model that has previously been conformed to images of real objects acquired in context.

Figure 1:
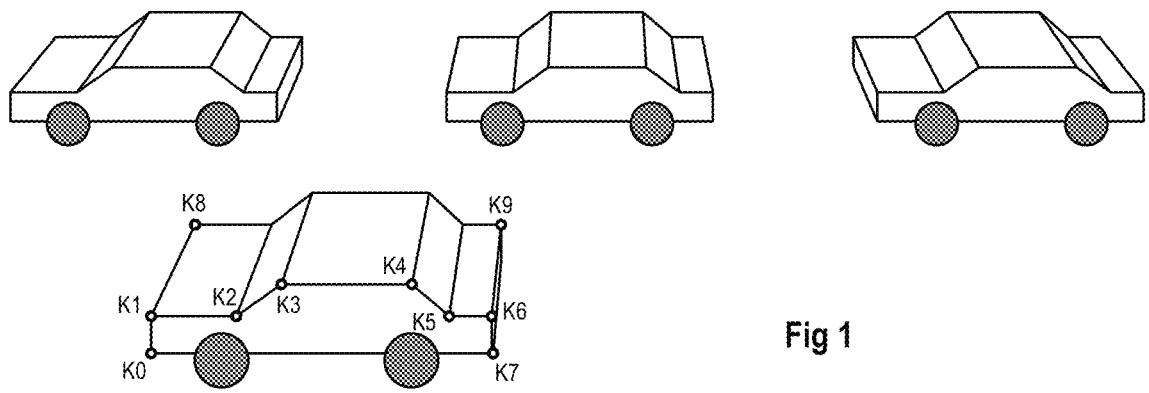
FIG. 1 shows a schematic three-dimensional generic model of an object, projected in different positions of a scene observed by a camera.

FIG. 1 illustrates a simplified generic model of an object, for example a car, projected on an image in different positions of an exemplary scene monitored by a fixed camera. The scene is here, for sake of simplicity, a street horizontally crossing the field of view of the camera.

In the background, the model is projected in three aligned positions, in the center and near the left and right edges of the image. In the foreground, the model is projected slightly offset to the left. All these projections stem from the same model from the point of view of the dimensions and show the morphological variations of the projections in the image as a function of the position in the scene. In a more complex scene, such as a curved street, one would also see morphology variations based on the orientation of the model.

The morphology variations as a function of the position are defined by the projection of the plane on which the objects evolve, here the street. The projection of the plane of evolution is defined by equations that depend on the characteristics of the camera (field of view, focal length and distortion of the lens). Edges perpendicular to the camera axis change size homothetically as a function of distance from the camera, and edges parallel to the camera axis follow vanishing lines. As a result, during a lateral displacement of a car in the illustrated view, the front face of the car, initially visible, is hidden as it crosses the center of the image, while the rear face, initially hidden, becomes visible as it crosses the center of the image. The upper face of the car, always visible in this example, shears according to vanishing lines.

In summary, the projections of the same object in the image at different positions or orientations have a variable morphology, even if the real object has a fixed morphology. Of course, real objects may also have a variable morphology, whether from one object to another (between two cars of different models), or during the movement of the same object (pedestrian). Learning systems are well suited to this situation, when they have been configured with enough data to represent the range of most likely projected morphologies.

A three-dimensional generic model that may be used herein, for example a PDM (Point Distribution Model), may comprise a mesh of nodes linked to each other by constraints, i.e. parameters that establish the relative displacements between adjacent nodes or the deformations of the mesh which are caused by displacements of certain nodes, known as landmarks. The landmarks are chosen so that their displacements make it possible to achieve all the desired morphologies of the model within the defined constraints.

As shown in FIG. 1, in the foreground, a simplified generic car model may include, for the bodywork, a mesh of 16 nodes defining 10 rectangular surfaces and having 10 landmarks. Eight landmarks K0 to K7 define one of the lateral faces of the car, and the remaining two landmarks K8 and K9, located on the other lateral face, define the width of the car. A single landmark would be sufficient to define the width of the car, but the presence of two landmarks or more will enable fitting the model to a projection of a real object, taking into account the deformations of the projection. The wheels are a characteristic element of a car and can be assigned a specific set of landmarks, not shown, defining the wheelbase, the diameter and the points of contact with the road.

Various constraints may be assigned to these landmarks so that the model is consistent with the range of cars to be detected, for example, maintaining parallelism between the two lateral faces; maintaining parallelism between the front and rear faces; maintaining parallelism between the edges perpendicular to the lateral faces; ensuring that the nodes K3 and K5 are above the nodes K1 and K6; ensuring that the nodes K3 and K4 are above the nodes K2 and K5; ensuring that the nodes K2 and K3 are to the right of the nodes K1 and K2; ensuring that the nodes K4 and K5 are to the left of the nodes K5 and K6, etc.

As previously indicated, the illustrated generic 3D model is simplistic, for sake of clarity of the disclosure. In practice, the model will have a mesh that is finer and can define curved edges and surfaces.

Figure 2:
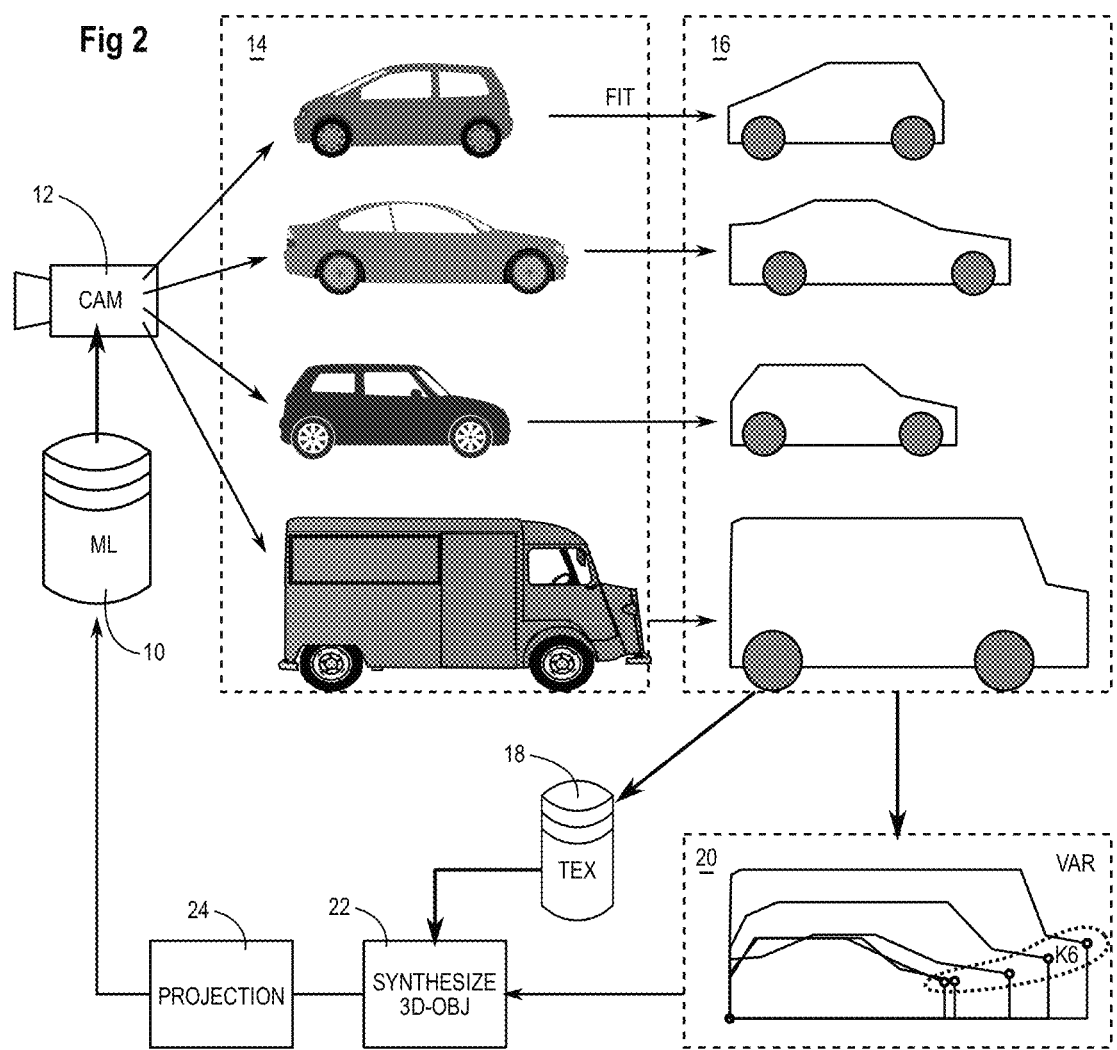
FIG. 2 schematically illustrates a configuration phase of a machine learning system for recognizing objects according to the generic model of FIG. 1.

FIG. 2 schematically illustrates a configuration phase of a machine learning system for recognizing cars according to the generic model of FIG. 1, by way of example. The learning system comprises a data set 10 associated with a camera 12 installed for monitoring a scene, for example that of FIG. 1.

The configuration phase may start from an existing data set, which may be summary and offer only a low recognition rate. This existing data set may have been produced by a quick and carefree supervised learning phase. The subsequent steps are performed to complement the data set to achieve a satisfactory recognition rate.

The recognition system is turned on and starts recognizing and tracking cars in successive images captured by the camera. An image instance of each recognized car is extracted in 14. To simplify the disclosure, only one lateral face of the cars is illustrated in the instances—in fact each instance is a perspective projection in which most often other faces are visible.

The camera typically produces several images that each contain one instance of the same car at a different position. The largest instance may be selected, which will have the best resolution for the subsequent operations.

The generic 3D model is then conformed to each image instance thus extracted. This may be achieved with a conventional fitting algorithm, which seeks, for example, the best matches between the image and the landmarks of the model as projected in the plane of the image. It is also possible to use algorithms based on landmark detection, as described, for example, in ["One Millisecond Face Alignment with an Ensemble of Regression Trees", Vahid Kazemi et al. IEEE CVPR 2014]. Of course, it is preferable that other faces of the cars are visible in the instances so that the model can be defined completely.

These conformation operations produce 3D models that are supposed to be scaled to the real objects. For this purpose, the conformation operations may use the equations of the projection of the plane of evolution of the object. These equations may be determined manually from the camera characteristics and the configuration of the scene, or estimated by the system in a calibration phase using, if necessary, suitable tools such as depth cameras. Based on the knowledge that the objects evolve on a plane, the equations can be deduced from the size variation according to the position of the instances of a tracked object.

At the end of each conformation, a 3D model is produced at 16, representing the recognized car to scale. The models are illustrated in two dimensions, in correspondence with the extracted lateral faces 14. (Note that the generic 3D model used is conformable to cars, vans and even buses. Thus, the system is here configured to recognize any four-wheel vehicle.)

During the conformation step, it is also possible to sample the image areas corresponding to the different faces of the car, and to store these image areas in the form of textures at 18.

After a certain acquisition time, a multitude of 3D models representing different cars, as well as their textures, will have been collected without supervision. If the recognition rate offered by the initial data set is poor, the acquisition time may be extended to reach a satisfactory number of models in the collection.

When the model collection 16 is judged to be satisfactory, the models are compared with each other at 20 and a variation range for each landmark is stored. An exemplary variation range for landmark K6 has been illustrated.

The variation ranges may define relative variations affecting the shape of the model itself, or absolute variations such as the position and orientation of the model. One of the landmarks, for example K0, may serve as an absolute reference. It may be assigned ranges of absolute variation that determine the possible positions and orientations of the car in the image. These ranges are in fact not directly deductible from the stored models, since a stored model may originate from a single instance chosen among multiple instances produced during the displacement of a car. The position and orientation variations may be estimated by deducing them from the multiple instances of a tracked car, without carrying out a complete conformation of the generic model to each instance.

For a landmark diagonally opposed to K0, for example K6, a variation range relative to landmark K0 may be established, which determines the length of the car. For another diagonally opposed landmark, for example K8, a variation range relative to landmark K0 may be established, which determines the width of the car. The variation range of each of the other landmarks may be established relative to one of its adjacent landmarks.

Once the variation ranges are established, a multitude of virtual 3D cars are synthesized at 22 from the generic model by varying the landmarks in their respective variation ranges. One of the textures 18 may also be mapped on each virtual car. The landmark variations may be random, incremental, or a combination of both.

At 24, each synthesized car is projected in the image plane of the camera to form an automatically annotated image instance completing the data set 10 of the learning system. These projections also use the equations of the projection of the plane of evolution of the cars. A same synthesized car may be projected in several positions and different orientations, according to the absolute variation ranges that were previously determined. In general, the orientations are correlated to the positions, so that the two parameters will not be varied independently, unless it is desired to detect abnormal situations, such as a car oriented transversely to the road.

If the initial data set was insufficient, the data set complemented by this procedure could still have gaps preventing the detection of certain car models. In this case, an automatic configuration phase may be reiterated, starting from the completed data set. This data set normally offers a better recognition rate than the initial set, which will lead to the constitution of a more varied collection of models 16, making it possible to refine the parameter variation ranges and to synthesize models 22 that are both more accurate and more varied, and enhance the data set 10.

As previously indicated, the initial data set may be produced by simple and fast supervised learning. In such a procedure, an operator views images of the observed scene and, using a graphical interface, annotates the image areas corresponding to instances of the objects to be recognized.

Since the subsequent configuration procedure is based on the morphological variations of the generic model, the operator may wish to annotate the objects exhibiting the most significant variations. The operator may thus annotate at least two objects whose morphologies are at opposite extremes of a variation domain that the operator has observed.

The interface may be designed to establish the equations of the projection of the evolution plane with the assistance of the operator. The interface may then propose to the operator to manually conform the generic model to image areas, offering both an annotation and the creation of the first models in the collection 16.

This annotation phase is cursory and fast, the goal being to obtain a limited initial data set allowing to initiate the automatic configuration phase that will complete the data set.

Many variations and modifications of the embodiments described herein will be apparent to the skilled person. Although these embodiments relate essentially to the detection of cars, the car is presented only as an example of an object that one may wish to recognize. The principles described herein are applicable to any object that can be modeled generically, including deformable objects, such as animals or humans.

What is claimed is:

1. A method for automatically configuring a system for recognizing a class of objects of variable morphology, the method comprising:
   providing a machine learning system with an initial data set sufficient to recognize instances of objects of the class in a sequence of images of a target scene;
   providing a generic three-dimensional model specific to the class of objects, the morphology of which can be defined by a set of parameters;
   acquiring a sequence of images of the scene using a camera;
   recognizing image instances of objects of the class in the acquired image sequence, using the initial dataset;
   conforming the generic three-dimensional model to recognized image instances;
   storing variation ranges of the parameters resulting from the conformations of the generic model;
   synthesizing multiple three-dimensional objects from the generic model by varying the parameters in the stored variation ranges; and
   complementing the data set of the learning system with projections of the synthesized objects in the plane of the images;
   wherein the initial data set of the learning system is obtained by supervised learning involving at least two objects of the class whose morphologies are at opposite ends of an observed variation domain of morphologies.

2. The method of claim 1, further comprising:
   defining parameters of the generic three-dimensional model by the relative positions of landmarks of a mesh of the model, the positions of the other nodes of the mesh being bound to the landmarks by constraints; and
   performing conformations of the generic three-dimensional model by positioning landmarks of a projection of the model in the plane of the images.

3. The method of claim 1, further comprising:
   storing textures from areas of the recognized image instances; and
   mapping on each synthesized object a texture among the stored textures.

* * * * *